(12) United States Patent
Villanueva

(10) Patent No.: US 7,914,422 B1
(45) Date of Patent: Mar. 29, 2011

(54) EXERCISE DEVICE

(76) Inventor: Leonardo Villanueva, San Diego, CA (US)

( * ) Notice: Subject to any disclaimer, the term of this patent is extended or adjusted under 35 U.S.C. 154(b) by 0 days.

(21) Appl. No.: 12/653,679

(22) Filed: Dec. 17, 2009

Related U.S. Application Data

(60) Provisional application No. 61/203,277, filed on Dec. 19, 2008.

(51) Int. Cl.
*A63B 21/00* (2006.01)

(52) U.S. Cl. ............................ 482/66; 482/72; 482/57

(58) Field of Classification Search .................. 482/66, 482/72, 57; 280/240, 233, 234, 220, 238, 280/241, 248
See application file for complete search history.

(56) References Cited

U.S. PATENT DOCUMENTS

| | | | | |
|---|---|---|---|---|
| 91,035 | A * | 6/1869 | Mcmillin | 280/233 |
| 535,593 | A * | 3/1895 | Mann | 280/240 |
| 891,872 | A * | 6/1908 | Smith | 280/238 |
| 1,500,854 | A * | 7/1924 | Starr | 280/241 |
| 1,620,926 | A * | 3/1927 | Trullinger | 280/234 |
| 2,012,683 | A * | 8/1935 | Johnson | 280/220 |
| 4,437,677 | A | 3/1984 | Ksayian | |
| 4,639,007 | A * | 1/1987 | Lawrence | 280/234 |
| 4,700,962 | A | 10/1987 | Salmon | |
| 5,492,349 | A * | 2/1996 | Ferez | 280/248 |
| 6,609,724 | B1 | 8/2003 | Davonik | |
| 7,223,210 | B2 * | 5/2007 | Krul et al. | 482/57 |

* cited by examiner

*Primary Examiner* — Jerome Donnelly
(74) *Attorney, Agent, or Firm* — Emery L. Tracy

(57) ABSTRACT

An exercise device for exercising a person's body is provided. The exercise device comprises a frame having a first side rail, a second side rail substantially perpendicular to the first side rail, a front rail between the first side rail and the second side rail, and a rear rail opposite the front rail and between the first side rail and the second side rail. A front axle is mounted to the front rail and a rear axle is mounted to the first side rail and the second side rail adjacent the rear rail. A wheel is rotatably attached to each end of each axle. A handlebar is pivotally mounted to and between the first side rail and the second side rail. A propelling gear is rotatably mounted on the handlebar between the first side rail and the second side rail with the gear rotatable in only one direction. A freewheel/gear system is mounted on the rear axle and a rotatable gear is mounted to the front rail. A chain loop is connectingly positioned around the propelling gear, the freewheel/gear system, and the rotatable gear. A pair of guide rails extends between and mounted to the rear axle and the handlebar and a seat is movable along the guide rails. A pair of footrests is mounted to the front axle wherein upon the handlebar being pivoted in a first direction, the exercise device is propelled in a generally forward direction.

10 Claims, 1 Drawing Sheet

EXERCISE DEVICE

The present application claims the benefit of priority of provisional patent application Ser. No. 61/203,277 filed on Dec. 19, 2008, entitled "Exercise Device".

BACKGROUND OF THE INVENTION

1. Field of the Invention

This invention relates generally to an exercise device and, more particularly, the invention relates to an exercise device for exercising a person's body.

2. Description of the Prior Art

Regular activity, fitness, and exercise, are critical for the health and well being of people of all ages. Research shows that everyone, young or old, can benefit from regular exercise, either vigorous or moderate. Even very old adults can improve mobility and function through physical activity. It should be a priority for everyone. Millions of people suffer from chronic illnesses that can significantly improve through activity. Exercise reduces the risk of heart disease, diabetes, colon cancer, and high blood pressure. People who are active outlive those who are inactive.

Despite the well-known benefits, most adults and children lead relatively sedentary lifestyles. They are not active enough. A sedentary lifestyle is defined as engaging in no leisure-time physical activity (exercises, sports, physically active hobbies) in a two-week period. Typically, a lot of older people lead sedentary lifestyles. Additionally, more than one-third of young people in grades 9-12 do not exercise regularly, mainly because they tend to watch too much television. The cost to the medical establishment is in the billions for treatments of diseases, which could be lessened with exercise. Physical activity maintains muscle strength, joint structure, joint functioning, and bone health. Exercise has an effect on mental health as well, especially among young people. It increases the capacity for learning, increases self-esteem and reduces anxiety and stress. Sports can introduce skills such as teamwork, self-discipline, sportsmanship, leadership and socialization. Lack of recreational activity may contribute to making young people susceptible to gangs, drugs, or violence. A very worrisome problem that can be attributed, at least in part, to lack of exercise or physical activity is obesity.

Obesity has become a nationwide epidemic. Regular activity, along with a nutritious diet, that incorporates portion control is the key to maintaining a healthy weight. Public and private sectors need to band together to encourage more activity. Walking programs for schools, work sites and the local community are some examples. The most important change has to come from the individual and families. Then commit to a lifestyle that is active for the whole family.

SUMMARY

The present invention is an exercise device for exercising a person's body. The exercise device comprises a frame having a first side rail, a second side rail substantially perpendicular to the first side rail, a front rail between the first side rail and the second side rail, and a rear rail opposite the front rail and between the first side rail and the second side rail. A front axle is mounted to the front rail and a rear axle is mounted to the first side rail and the second side rail adjacent the rear rail. A wheel is rotatably attached to each end of each axle. A handlebar is pivotally mounted to and between the first side rail and the second side rail. A propelling gear is rotatably mounted on the handlebar between the first side rail and the second side rail with the gear rotatable in only one direction. A freewheel/gear system is mounted on the rear axle and a rotatable gear is mounted to the front rail. A chain loop is connectingly positioned around the propelling gear, the freewheel/gear system, and the rotatable gear. A pair of guide rails extends between and mounted to the rear axle and the handlebar and a seat is movable along the guide rails. A pair of footrests is mounted to the front axle wherein upon the handlebar being pivoted in a first direction, the exercise device is propelled in a generally forward direction.

DETAILED DESCRIPTION OF THE PREFERRED EMBODIMENTS

Figure 1:
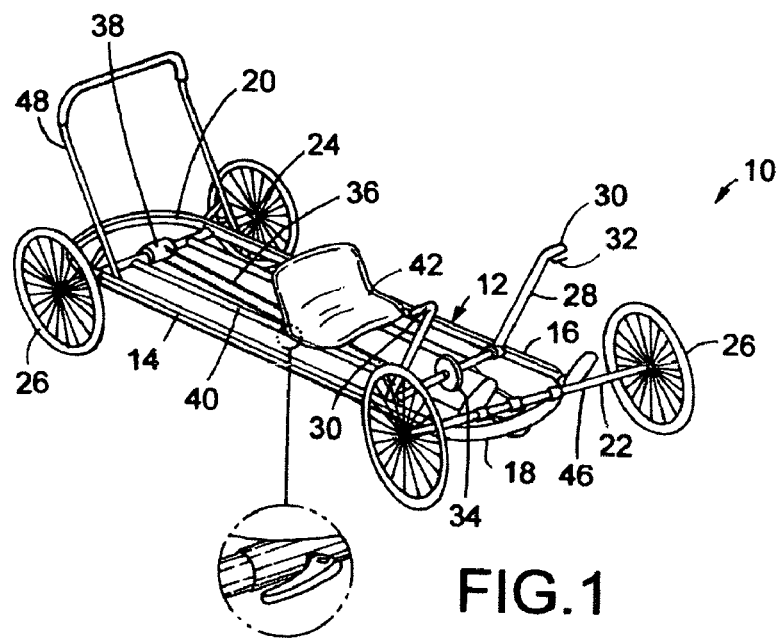
FIG. 1 is a perspective view illustrating an exercise device, constructed in accordance with the present invention.
Figure 2:
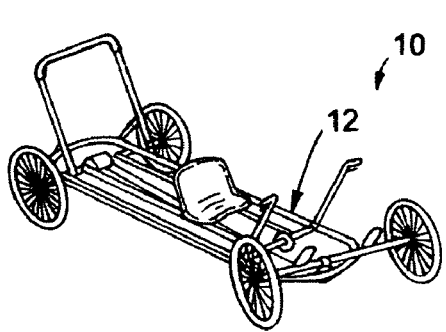
FIG. 2 is a front perspective view illustrating the exercise device, constructed in accordance with the present invention.
Figure 3:
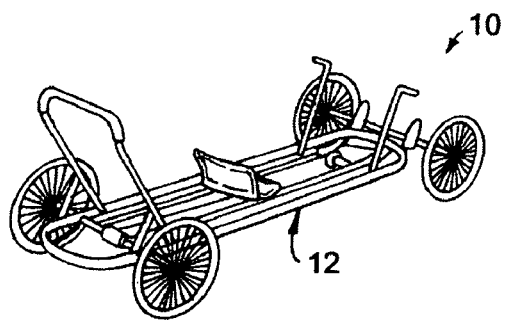
FIG. 3 is a rear perspective view illustrating the exercised device, constructed in accordance with the present invention.

As illustrated in FIGS. 1-3, the present invention is an exercise device, indicated generally at 10, for exercising a person's body. The exercise device 10 of the present invention is a rowing machine type exercise machine for exercise many parts of the user's body.

The exercise device 10 of the present invention has a frame 12 having a first side rail 14, a second side rail 16 substantially perpendicular to the first side rail 14, a front rail 18 between the first side rail 14 and the second side rail 16, and a rear rail opposite 20 the front rail 18 and between the first side rail 14 and the second side rail 16. Preferably, the front rail 18 and the rear rail 20 are rounded providing better structural strength to the front rail 18 and the rear rail 20.

In addition, the exercise device 10 of the present invention has a front axle 22 mounted to the front rail 18 and a rear axle 24 mounted to the first side rail 14 and the second side rail 16 adjacent the rear rail 20. Both the front axle 22 and the rear axle 24 preferably extend beyond the first side rail 14 and the second side rail 16. Attached to each end of each axle 22, 24 is a wheel 26. Preferably, the wheels 26 are bicycle type wheels although having other types of wheels 26 are within the scope of the present invention.

The exercise device 10 of the present invention further has a handlebar 28 pivotally mounted to and between the first side rail 14 and the second side rail 16. The handlebar 28 is preferably substantially U-shaped and is seated between the first side rail 14 and the second side rail 16. A pin, screw, or other type of fastener is inserted through the first side rail 14 into the handlebar 28 and another pin, screw, or other type of fastener is inserted through the second side rail 16 into the handlebar 28 allowing the handlebar 28 to pivot relative to the frame 12. Movement of the handlebar 28 relative to the frame 12 allows the user to propel the exercise device 10, as will be described in further detail below.

The handlebar 28 of the exercise device 10 of the present invention has two handles 30 secured to the handlebar 28 for receiving the hands of the user. Attached to at least one of the handles 30 is a brake handle 32. A brake cable or the like extends from the brake handle 32 to at least one of the wheels 26, in a known manner, allowing a user to depress the brake handle 32 to slow the exercise device 10. It should be noted and understood by those persons skilled in the art that the height of the handles 30 relative to the frame 12 is adjustable to accommodate users of different heights.

In addition, the handlebar 28 of the exercise device 10 of the present invention has a gear 34 centrally mounted on the handlebar 28 between the first side rail 14 and the second side rail 16 with a chain loop 36 positioned on a top and a bottom of the gear 34. The gear 34 is rotatable in one direction only. In particular, the gear 34 is rotatable as the handles 30 are pivoted back toward the rear rail 20 of the frame 12. Appropriate connections and/or mechanisms are provided between the handlebar 28 and the gear 34 allowing the one-way movement of the gear 34.

In other words, when the handles 30 of the exercise device 10 of the present invention are pushed in a generally forward direction, the gear 34 does not rotate thereby always propelling the exercise device 10 in a single, forward direction. Mounted on the front rail 18 and the rear axle 24 are multi-speed freewheel/gear boxes 38 for receiving the chain loop 36 and accomplishing the forward only movement of the exercise device 10. As the gear 34 is rotated with the movement of the handles 30 in a general direction toward the rear rail 20, the chain loop 36 causes the rear wheels 26 to rotate through the combination of the freewheel/gear boxes 38 thereby propelling the exercise device 10 in a generally forward direction.

Furthermore, the exercise device 10 of the present invention has a pair of guide rails 40 extending between and mounted to the rear axle 20 and the handlebar 28. The guide rails 40 receive a seat 42 having corresponding rollers or track following mechanisms rollable along the guide rails 40. The seat 42 can be releasably locked into place with a tension lever 44, if desired.

Additionally, the exercise device 10 of the present invention has a pair of footrests 46 mounted to the front axle 14. In operation, the user sits in the slidable seat 42 and uses the footrests 46 for steering. In order to accomplish this, the front axle 22 can be pivotally mounted to the front rail 14 or the front axle 22 is distortable to cause the front axle 22 to bend when pressure is applied from the user on the footrests 46. Work done by the user in pulling the handles 30 is transferred to the chains 36 which run in a continuous loop between the gears 34 located on the front rail 14 and the rear axle 24 causing the rear axle 24 to rotate and the exercise device 10 to move in a forward direction. A removable and/or collapsible push handle 48 can be attached to the frame 12 allowing a person to easy push the exercise device 10 without bending over.

When a person uses the exercise device 10 of the present invention, they are getting a total body workout. The exercise device 10 utilizes the muscles in the buttocks, the legs, and the arms and, while it does provide a workout for the back, it does not strain the back muscles when performed correctly. Rowing is extremely repetitive and a user can get into symmetry of motion once they start rowing. Rowing is a useful and efficient way of relaxing the mind as well as toning the body. The exercise device 10 delivers both these advantages with the unique movement system.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. An exercise device for exercising a person's body, the exercise device comprising:
   a frame having a first side rail, a second side rail substantially perpendicular to the first side rail, a front rail between the first side rail and the second side rail, and a rear rail opposite the front rail and between the first side rail and the second side rail;
   a front axle mounted to the front rail;
   a rear axle mounted to the first side rail and the second side rail adjacent the rear rail;
   a wheel rotatably attached to each end of each axle;
   a handlebar pivotally mounted to and between the first side rail and the second side rail;
   a propelling gear rotatably mounted on the handlebar between the first side rail and the second side rail, the gear rotatable in only one direction;
   a freewheel/gear system mounted on the rear axle, the chain loop travelable over the freewheel/gear system;
   a rotatable gear mounted to the front rail;
   a chain loop connectingly positioned around the propelling gear, the freewheel/gear system, and the rotatable gear;
   a pair of guide rails extending between and mounted to the rear axle and the handlebar;
   a seat movable along the guide rails;
   a pair of footrests mounted to the front axle;
   wherein upon the handlebar being pivoted in a first direction, the exercise device is propelled in a generally forward direction.

2. The exercise device of claim 1 wherein the front rail and the rear rail are substantially rounded.

3. The exercise device of claim 1 wherein the wheels are bicycle wheels.

4. The exercise device of claim 1 wherein the handlebar is substantially U-shaped and is pivotally seated between the first side rail and the second side rail.

5. The exercise device of claim 4 and further comprising:
   a first fastener inserted through the first side rail into the handlebar; and
   a second fastener inserted through the second side rail into the handlebar;
   wherein the first fastener and the second fastener allow the handlebar to pivot relative to the frame.

6. The exercise device of claim 1 and further comprising: two handles secured to the handlebar.

7. The exercise device of claim 1 and further comprising:
   a brake handle attached to at least one of the handles; and
   a brake cable extending from the brake handle;
   wherein upon depressing the brake handle, the exercise device slows down to at least one of the wheels, in a known manner, allowing a user to depress the brake handle to slow the exercise device.

8. The exercise device of claim 1 wherein the seat has corresponding rollers rollable along the guide rails.

9. The exercise device of claim 1 wherein the propelling gear is rotated with movement of the handlebar in a general direction toward the rear rail causing the chain to rotate across the propelling gear thereby causing the freewheel/gear system to rotate the rear axle and causing the exercise device to be propelled forward.

10. The exercise device of claim 9 wherein movement of the handlebar in a general direction toward the front rail, the handlebar rotates freely within the propelling gear without causing the propelling gear to rotate.

* * * * *